United States Patent [19]

Amoroso

[11] 4,235,168

[45] Nov. 25, 1980

[54] VEHICLE WITH CONVERTIBLE WHEELS

[75] Inventor: Michael J. Amoroso, Marion, Ill.

[73] Assignee: M.A.T. Industries, Inc., West Frankfort, Ill.

[21] Appl. No.: 920,535

[22] Filed: Jun. 29, 1978

[51] Int. Cl.³ .............................................. B61F 13/00
[52] U.S. Cl. ................................................. 105/215 C
[58] Field of Search ................... 105/215 C, 178, 211, 105/215 R

[56] References Cited

U.S. PATENT DOCUMENTS

| | | | |
|---|---|---|---|
| 3,353,504 | 11/1967 | Kersey et al. | 105/215 C |
| 3,822,649 | 7/1974 | Walk et al. | 105/215 C |

*Primary Examiner*—Richard A. Bertsch
*Attorney, Agent, or Firm*—Cohn, Powell & Hind

[57] ABSTRACT

This vehicle includes a frame having inboard rail bearing wheels and outboard carriages carrying ground bearing wheels. The carriages are mounted to opposite sides of the frame for vertical movement in a guide system provided at each side of the frame and each carriage provides a mounting for fore and aft ground wheels. A counterbalance system is used to facilitate raising the carriages independently of each other from a ground engaging mode to a retracted mode and a latching system holds the carriages in place in each mode.

17 Claims, 12 Drawing Figures

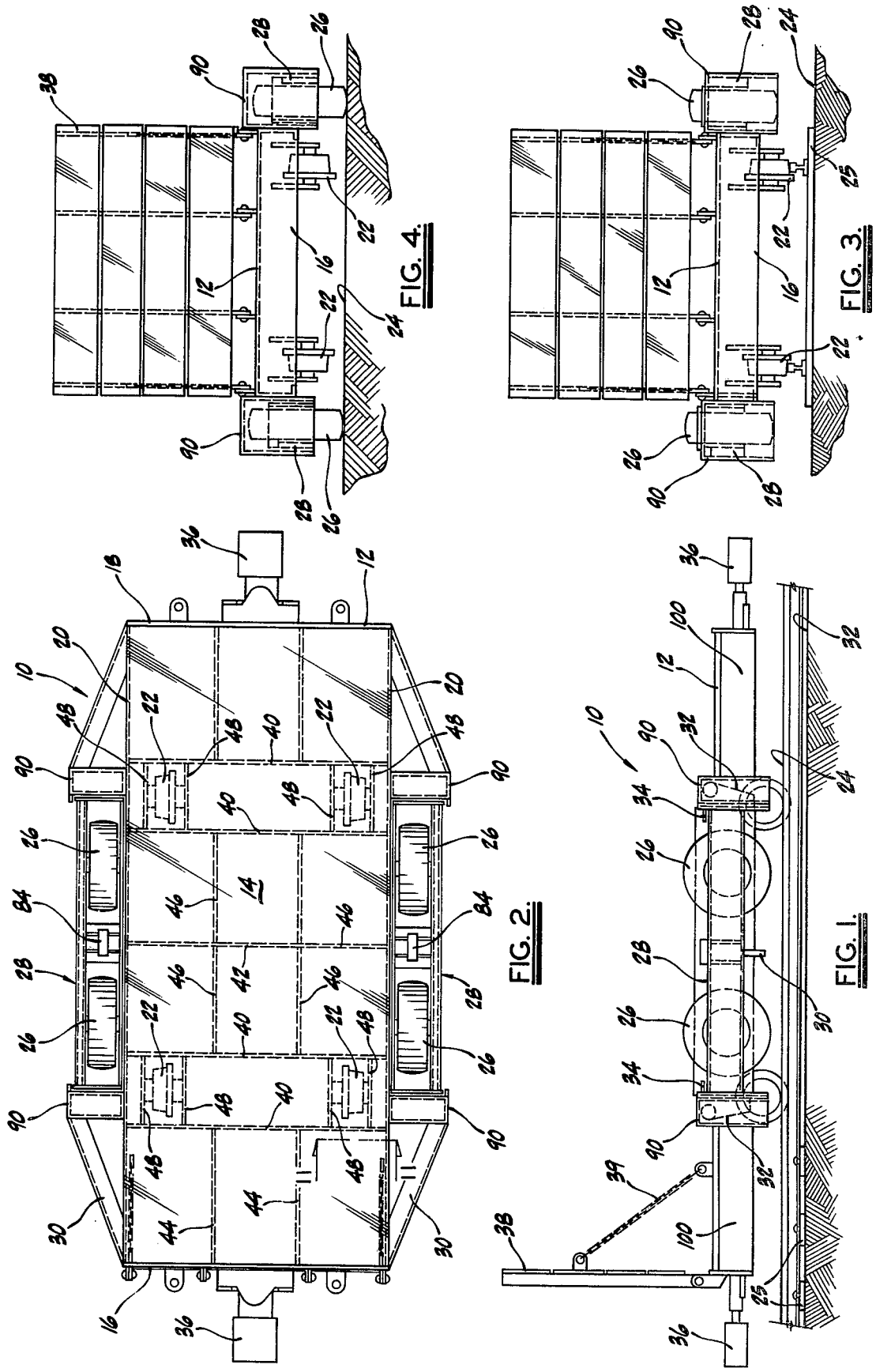

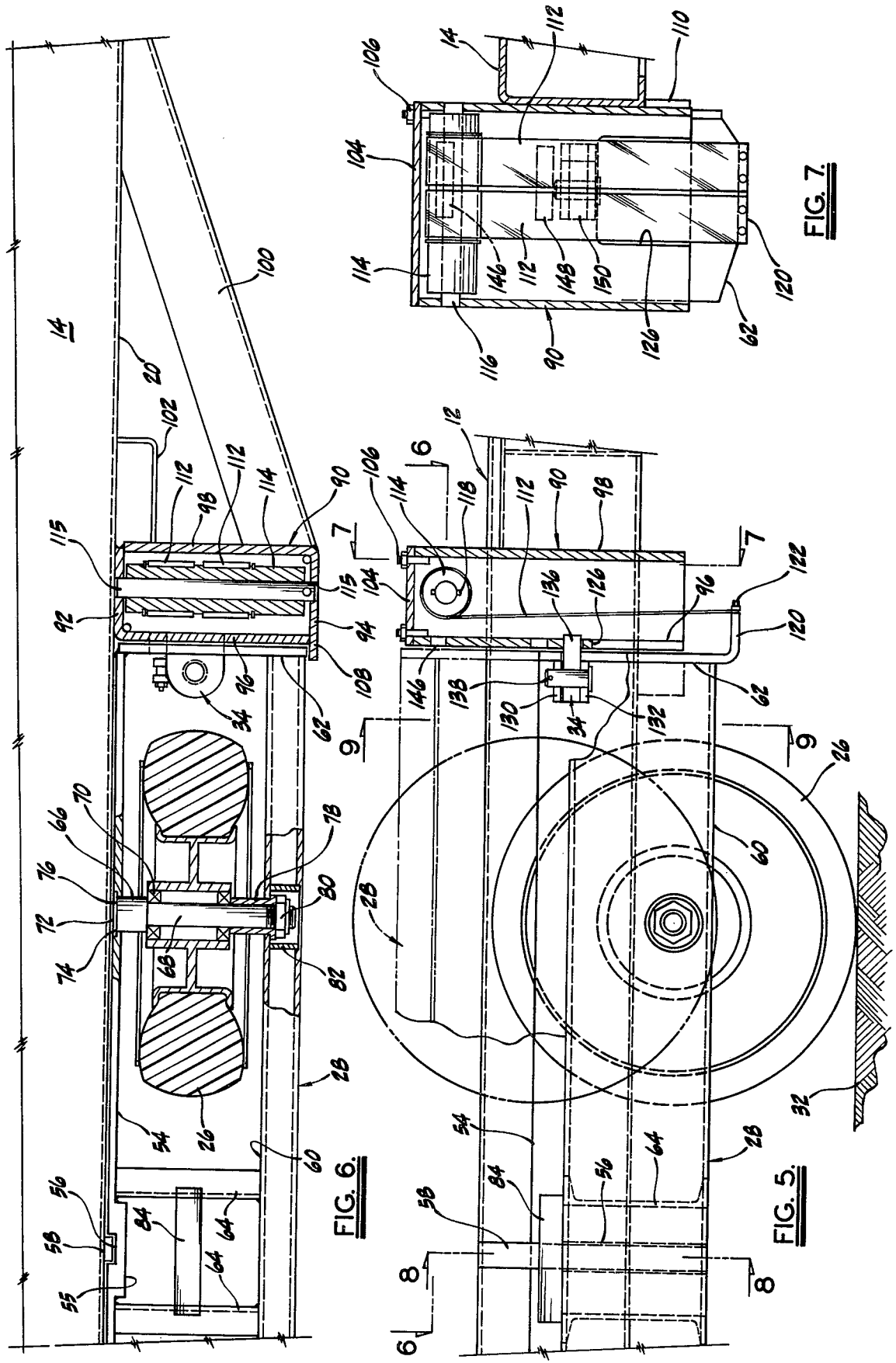

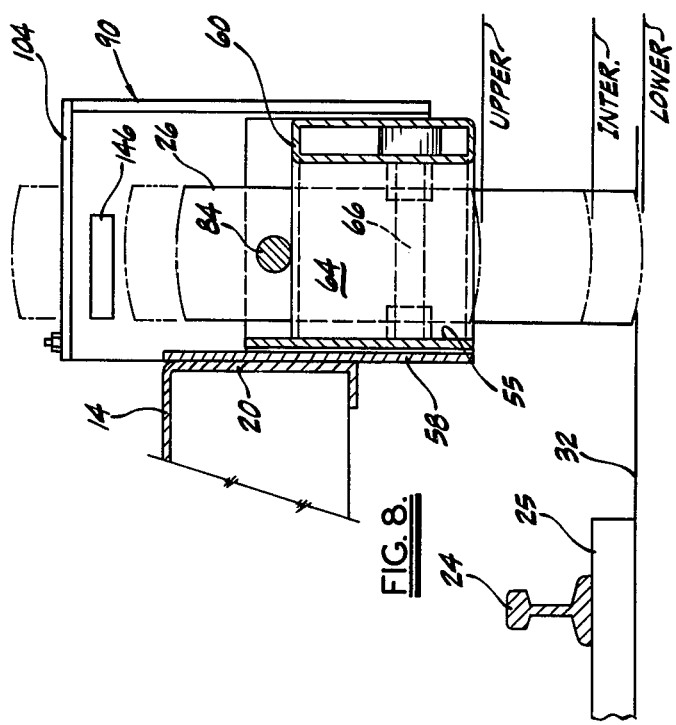
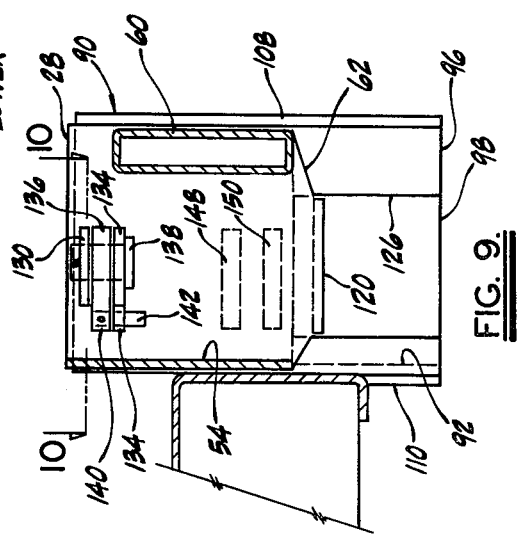
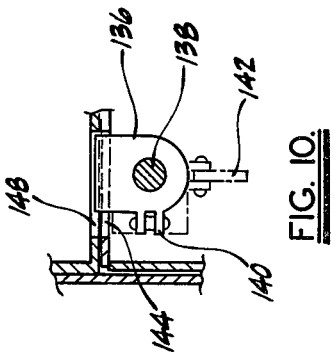
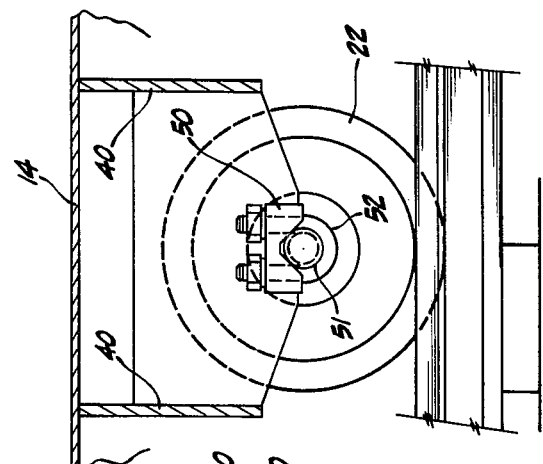
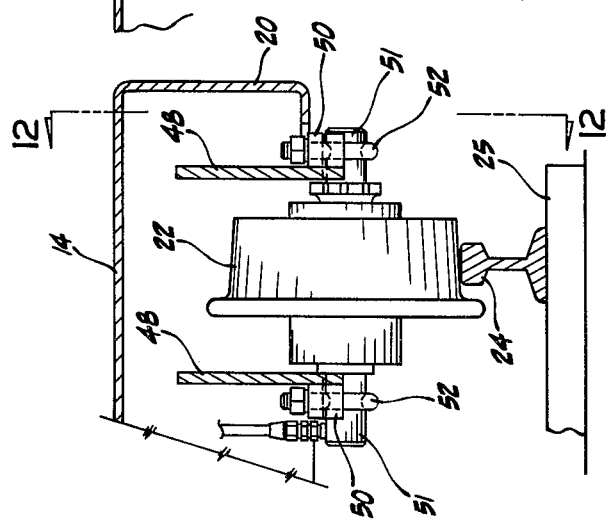

VEHICLE WITH CONVERTIBLE WHEELS

BACKGROUND OF THE INVENTION

This invention relates generally to vehicles of the type having convertible sets of wheels, one set being track wheels permitting use of the vehicle on rails and the other set being rubber wheels permitting use of the vehicle on paved or unpaved ground surfaces.

Vehicles of this type are sometimes referred to as rubber-rail cars. Such vehicles are provided with rail bearing track wheels and retractable ground bearing wheels and are commonly used in coal mines and in other industries for supply cars which perform part of their transportation function on rails and part on roads.

In general, when the vehicles are operated on a track, the rubber tired ground wheels are retracted to a position above the rails on each side of the car. At the end of the track, when the track wheels are no longer needed, the ground wheels are lowered and locked in place so that the vehicle can travel over ground. In vehicles of the type currently being used it is necessary to provide ramp-like trenches alongside the rail ties as a transition between the rail and ground operation. As the vehicle is pulled off the end of the track, the ground wheels pick up the weight as the wheels come out of the trenches and lift the track wheels from the rails so that the car can be operated as a trailer. The procedure is reversed when the vehicle is returned to the rails.

Several problems are encountered in using known vehicles of this type. One such problem lies in the difficulty of maintaining the trenches alongside the track. These trenches tend to become filled with debris and dirt and make it very difficult to lower the ground wheels effectively.

Another problem has arisen from the need to move the convertible vehicles during mine clean-up. In most mines battery-powered scoops are used to ensure that the mine floors are kept clean in accordance with Bureau of Mines requirements. These scoops simply push the vehicles aside and, because of the structure of the ground wheel carriages which are invariably cantilever arms mounting each of the four wheels individually, the carriages can become damaged or even destroyed in some instances.

Yet another significant problem encountered with cars of this type lies in the manual handling of the conversion mechanism. The conversion is usually undertaken by a single operator and the lowering of the wheels which are of a substantial weight while at the same time the latching of the carriage is difficult for one person to accomplish alone.

The present convertible vehicle solves these and other problems in a manner not disclosed in the known prior art.

SUMMARY OF THE INVENTION

This convertible wheel vehicle is equipped with rail bearing wheels and retractible sets of ground engaging wheels and is provided with means for selectively raising and lowering the ground engaging wheels for conversion of the vehicle from a rail mode to an over ground mode.

The vehicle includes a frame having inboard rail bearing wheels mounted to the frame for rotation about fixed axes and outboard carriages are provided on each side of the frame for guided movement from an upper, retracted position to a lower ground engaging position. Each carriage provides a mounting for two wheels and permits the simultaneous movement of two wheels on one side of the frame thereby reducing the time for converting from the rail mode to the ground mode.

The vehicle includes a counterbalance assembly connected between the frame and each carriage to facilitate movement of said carriages between the upper and lower positions and latching means are provided for selectively holding the carriages in the upper and lower positions respectively. The counterbalance means include first connection means provided at each end of the carriage and second connection means carried by the frame adjacent the carriage ends. Constant force springs are provided which extend between the first and second connections to provide substantially constant balance during movement of the carriages relative to the frame.

The guide means include cooperating vertically disposed tongue and groove elements limiting fore and aft movement of each carriage and the frame includes outstanding portions at each end of each carriage having stop means overlappingly related to the carriage to limit relative outward movement thereof.

The means for selectively holding the carriages in the upper and lower positions include a latch member movably mounted to each end of each carriage and a plurality of cooperating latch openings provided on each outstanding member and receiving the latch member in latched relation.

The frame includes outstanding portions on each side which provide longitudinally spaced housings for the counterbalance means. Each housing includes a spool mounted therewithin at the upper end thereof for connection of one end of a balance spring, the other end of the spring being connected to a depending portion at each end of the carriage.

The carriages include outer tubular members having recessed pocket portions for the ground wheel shafts, said members thereby providing a bumper permitting the vehicle to be pushed sideways, while loaded, without damage.

Each carriage includes an intermediate handle to facilitate the raising and lowering thereof.

BRIEF DESCRIPTION OF THE DRAWINGS

FIG. 1 is a side elevational view of the vehicle with the ground wheels in the raised position;

FIG. 2 is a plan view thereof;

FIG. 3 is a front end elevational view thereof;

FIG. 4 is a similar view with the ground wheels in a lowered position;

FIG. 5 is an enlarged fragmentary elevational view of the carriage with the ground wheels in the lowered position;

FIG. 6 is a sectional view taken on line 6—6 of FIG. 5;

FIG. 7 is a sectional view taken on line 7—7 of FIG. 5;

FIG. 8 is a fragmentary sectional view taken on line 8—8 of FIG. 5;

FIG. 9 is a fragmentary sectional view taken on line 9—9 of FIG. 5;

FIG. 10 is a fragmentary sectional view taken on line 10—10 of FIG. 9;

FIG. 11 is a fragmentary sectional view taken on line 11—11 of FIG. 2, and

FIG. 12 is a fragmentary sectional view taken on line 12—12 of FIG. 11.

DESCRIPTION OF THE PREFERRED EMBODIMENT

Referring now by reference numerals to the drawings and first to FIGS. 1, 2 and 3, it will be understood that the convertible wheel vehicle is generally indicated by numeral 10 and includes a frame 12 defined by a deck 14, front and rear end plates 16 and 18 respectively, and side plates 20. The frame 12 in its rail mode is carried by front and rear bearing wheels 22 having fixed axes of rotation for travel on a pair of rails 24 supported by ties 25. In the ground mode the frame 12 is carried by front and rear pairs of ground wheels 26 rotatively mounted to oppositely disposed carriages 28 provided at each side of the frame. Each carriage is independently mounted for vertical sliding movement relative to an associated guide assembly generally indicated by numeral 30, for selective movement between an upper, retracted position and a lower position in which the wheels 26 engage the ground 32. The movement of the carriages 28 relative to the guide assemblies 30 is assisted by a counterbalance system 32 and each carriage 28 is held at a selected elevation relative to the frame 12 by means of a latch system 34 as shown in FIG. 5. Coupling members 36 are provided at each end of the vehicle 10 and a gate 38 held by a chain 39 can be provided at one end. The vehicle 10 is substantially symmetrical about its longitudinal and transverse axes and the primary components will now be more specifically described.

As shown in FIGS. 1 and 2, the frame 12 includes front and rear pairs of transverse stiffeners 40, an intermediate stiffener 42, and longitudinal stiffeners 44 and 46. Transverse stiffeners 40 provide a connection means for journal mounting plates 48 which, as shown in FIGS. 11 and 12 are provided with bearing blocks 50, attached as by welding to plates 48, and notched to receive the wheel axles 51. U-bolts 52 cooperate with said blocks 50 to removably attach axles 51 to the frame and the wheels 22 are rotatively mounted to said axles as by bearings (not shown).

The carriages 28 and the guide assemblies 30 are best understood by reference to FIGS. 5 through 9. As shown in FIGS. 5 and 6, each carriage 28 includes an inner plate member 54 having a thickened center portion 55 which is provided with a groove 56 adapted to receive a vertical guide rail 58 welded or otherwise attached to, and extending below, each side plate 20. Each carriage 28 also includes an outer tubular member 60 disposed in spaced parallel relation from said inner plate member 54 and connected to it by means of end plates 62 and intermediate channel members 64 welded, or otherwise attached to said inner and outer members. The ground wheels 26 are rotatively mounted between the inner plate member 54 and the outer tubular member 60 by means of a shaft 66 having a reduced portion 68 carrying wheel bearings 70, and having a head 72. The head 72 is provided with a flat and is received within an associated recess 74 having an arcuated welded key 76 to prevent rotation of said shaft 66. At its other end the shaft 66 is provided with a flanged sleeve 78 engageable with the inner wall of said tubular member 60 and the end of said shaft is threaded to receive a nut 80 by which the shaft is secured to the carriage 28. The front wall of the tubular member 60 is provided with an opening fitted with a sleeve 82 to define a pocket and this arrangement provides that the shaft 66 is effectively recessed inwardly of the outer wall of said tubular member and thereby protected. The arrangement also provides for rapid removal of the shaft 66 and the wheel 28 when the carriage 28 is in the lowered position. Each carriage 28 is raised and lowered relative to its associated guide assembly 30 by means of a handle 84 welded or otherwise attached between intermediate channel members 64.

In addition to the cooperating rail 58 and groove 56 described above, each guide assembly 30 includes opposed pairs of box-like hollow guide members 90 having inner and outer walls 92 and 94 respectively and side walls 96 and 98 respectively. The inner wall 92 is fixedly attached to the frame side plates 20, as by welding, and each side wall 98 is fixedly connected to said frame side plates by an outrigger arm 100 and an L-shaped stiffener member 102, said members being attached as by welding. The guide members 90 include a cover plate 104 removably attached as by welded rod and nut elements 106. As clearly shown in FIG. 6, the outer wall 94 of each guide member 90 includes a projecting lip 108 which overlaps each end portion of the associated carriage 28 to provide a means of retaining said carriages against outward movement. As shown in FIG. 7, relatively short end plates 110 are attached as by welding to the underside of the side plates 20 to provide inward support for the carriages 28.

Importantly, the hollow guide members 90 provide a housing for the counterbalance system 34. The counterbalance system consists essentially of four pairs of constant force extension springs 112, each pair being disposed about a spool 114 rotatively mounted between inner and outer walls 92 and 94 of the guide member 90 by means of a shaft 116 held in place as by a pin 118. The balance springs 112 are fixedly attached at their other end to an outstanding portion 120 of the carriage and plates 62 as by bolts 122. It is not necessary that the balance springs be attached to the spool 114 so long as they are free to unwind. The provision of the cover plates 104 on the guide members 90 facilitates the attachment of the balance springs 112. The spool 114 is positioned at the bottom of the housing provided by the guide members 90 and the free end of the spring 112 is bolted to the carriage. A sling (not shown) can then be wrapped around the ends of the spool 114 which is then lifted until the spool opening lines up with the opening 115 in the inner and outer walls 92 and 94 so that the spool shaft 116 can be inserted and locked into place as by pin 118. As best shown in FIG. 7, the guide member side walls 96 are each provided with a notch 126 to receive the outstanding leg 120 of the associated carriage end plate 62 to permit the carriage 28 to be moved upwardly relative to said guide members 90. The carriages 28 are held in upper, lower and intermediate positions by the latch assemblies 34 provided at each end of said carriages as will now be described.

As best shown in FIGS. 5, 9 and 10, each latch assembly consists of upper and lower plates 130 and 132 respectively welded or otherwise attached to each carriage end plate 62, said lower plate including a bifurcated portion 134. Sandwiched between said plates 130 and 132 is a rotatable latch member 136 which is connected in rotatable relation to said plates as by a pin 138. The latch member 136 is provided with a bifurcated portion 140 carrying a pivotable handle 142 which in its downwardly hanging position is received between the bifurcated portion 134 of the lower latch plate 132 thereby effectively locking the latch member 135 in place. The handle 142 can be raised up to a horizontal position in which it can be used to rotate the latch member 135 from a latched position into an unlatched position as shown in phantom outline in FIG. 10. In the latched position, the latch member 136 is receivable within an opening 144 provided in the end plate and within one of three openings 146, 148 and 150 provided in the guide member side plates 116, said openings defining upper, intermediate and lower positions respectively.

It is thought that the structural features and functional advantages of this convertible wheel vehicle have become fully apparent from the foregoing description of parts but for completeness of disclosure the operation of the vehicle will be briefly described.

In normal rail operation in the rail mode the disposition of the carriages 28 is as shown in FIGS. 1 and 3, i.e., in the upper, or raised position. This position is shown in detail in FIG. 9 and in phantom outline in FIG. 5. As shown in FIG. 9, the latch assembly latch member 136 is engageably received by the upper latch opening 146 in the guide members 90. In this position the carriage 28 is in its fully raised position and the balance springs are at their shortest length. The balance springs 112 are suitably chosen so that four springs, two at each end of the carriage 28, substantially compensate or counterbalance the weight of the carriage 28. Thus, when the latch pivot handle 142 is disengaged from the lower latch plate 132 and moved into a horizontal position, it is a simple matter to rotate the latch out of engagement with the latch opening 146 at each end of each carriage 28 and by depressing the single handle 84, each carriage is easily moved downwardly into its lower level of ground engagement. When this level is reached, each latch member is rotated into engagement with the lower latch opening 150. When both carriages have been lowered into ground engagement and latched in position, it becomes a simple matter to run the vehicle off the rails until it is fully supported by ground engagement. The reverse procedure to that described above is applied when it is required to return the vehicle into the rail bearing mode. In this condition, the ground wheels 26 are straddled equally on either side of the rails 24 and the carriage 28 on each side of the vehicle is unlatched and raised independently until the rail bearing wheels on that side of the frame 12 are relatively lowered into engagement with the rails. In those instances which the ground is at a high level owing to the existence of debris and the like on either side of the rail, it is possible to lower the carriages 28 into a somewhat higher position shown in FIG. 9 by rotating the latch members 136 into engagement with intermediate latch openings 148.

It will be readily understood that the carriages 28 are guided during vertical movement not only by the cooperating rails and grooves 58 and 54 respectively which retain the carriages in a fore and aft direction, but also by the overlapping lips 108 provided on each guide member 90 which retain the carriages against outward movement. Further, the central disposition of the carriage handles 84 and the ease of accessibility of the latch assemblies coupled with the counterbalance assistance provided by the balance springs 112 permits the carriages to be easily raised and lowered by a single operator.

I claim as my invention:

1. A convertible vehicle with wheels comprising:

(a) a frame including a longitudinal axis and having guide means on each side thereof,
(b) spaced front and rear rail bearing wheels mounted to the frame in rotatable relation on each side of said axis,
(c) a pair of carriages each received in sliding relation by an associated guide means on one side of said frame for vertical movement of each carriage relative to said frame from an upper retracted position to a lower position, each carriage including spaced front and rear ground engageable wheels rotatably mounted to the carriage for vertical movement with said carriages,
(d) counterbalance means including constant force spring means operatively connected between the frame and each carriage to facilitate movement of said carriages between the upper and lower positions, and
(e) means for selectively holding the carriages in the upper and lower positions.

2. A vehicle as defined in claim 1, in which:
(f) the means for holding the carriages in position include cooperating latch means on the frame and the carriages at each end of the carriages.

3. A vehicle as defined in claim 2, in which:
(g) the latch means includes a movable pivoted latch element at each end of each carriage and a plurality of vertically disposed fixed latch elements on the frame selectively receiving said movable elements in latched relation.

4. A vehicle as defined in claim 1, in which:
(f) each carriage includes front and rear ends, and
(g) the counterbalance means includes first connection means at each end of said carriage, second connection means carried by said frame adjacent said carriage ends and a constant force spring would thereon and operatively extending between said first and second connection means.

5. A vehicle as defined in claim 1, in which:
(f) the guide means includes cooperating vertically disposed tongue and groove elements, one of said elements being carried by the frame and the other of said elements being carried by the carriage to limit relative fore and aft movement of said carriage.

6. A vehicle as defined in claim 1, in which:
(f) the guide means includes cooperating vertically disposed members attached to said frame in overlapping relation to each end of said carriage to limit relative outward movement of said carriage.

7. A vehicle as defined in claim 1, in which:
(f) the frame includes spaced pairs of notched members disposed on each side thereof inboard of the carriages, and
(g) each rail bearing wheel includes a shaft received by said notched members and a U-bolt connecting said axle to said notched members.

8. A vehicle as defined in claim 1, in which:
(f) each carriage includes front and rear end members interconnected by inner and outer longitudinal side members,
(g) said ground engageable wheels are rotatably mounted between said side members and between said front and rear end members, and
(h) the frame includes front and rear relatively outstanding portions disposed adjacent said front and rear carriage ends and receiving said carriage therebetween.

9. A vehicle as defined in claim 8, in which:
(i) said frame outstanding portions include stop means overlappingly related to each end of said carriage to limit relative outward movement of said carriage.

10. A vehicle as defined in claim 7, in which:
(i) each of said ground engageable wheels includes a shaft mounted between said inner and outer carriage members, and
(j) said carriage outer member includes a pocket portion receiving said shaft whereby said shaft is recessed inwardly of said carriage.

11. A vehicle as defined in claim 7, in which:
(i) the means for holding the carriages in position include a movable latch element carried by each end of each carriage and a plurality of vertically disposed latch openings on each outstanding member selectively receiving said movable latch elements in latched relation.

12. A vehicle as defined in claim 11, in which:
(j) the latch openings include upper, lower and intermediate openings receiving said movable latch element to define upper, lower and intermediate wheel positions.

13. A vehicle as defined in claim 11, in which:
(j) the latch element at each end of each carriage is rotatable and includes a pivoted locking member operatively engageable with a frame outstanding member to lock the latch element in the selected position.

14. A vehicle with convertible wheels comprising:
(a) a frame including a longitudinal axis and having guide means on each side thereof,
(b) spaced front and rear rail bearing wheels mounted to the frame in rotatable relation on each side of said axis,
(c) a pair of carriages each received in sliding relation by an associated guide means on one side of said frame for vertical movement of each carriage relative to said frame from an upper retracted position to a lower position, each carriage including spaced front and rear ground engageable wheels rotatably mounted to the carriage for vertical movement with said carriages,
(d) counterbalance means operatively connected between the frame and each carriage to facilitate movement of said carriages between the upper and lower positions,
(e) means for selectively holding the carriages in the upper and lower positions,
(f) each carriage including front and rear ends interconnected by inner and outer longitudinal side members,
(g) said ground engageable wheels being rotatably mounted between said side members,
(h) the frame including front and rear relatively outstanding portions disposed adjacent said front and rear carriage ends and receiving said carriage therebetween,
(i) said outstanding portions providing housings, and
(j) said counterbalance means including a spool mounted within each housing, each spool having at least one constant force spring having one end wound on said spool, and the other end being connected to an adjacent end of said carriage means.

15. A vehicle with convertible wheels comprising:
(a) a frame including a longitudinal axis and having guide means on each side thereof,
(b) spaced front and rear rail bearing wheels mounted to the frame in rotatable relation on each side of said axis,
(c) a pair of carriages each received in sliding relation by an associated guide means on one side of said frame for vertical movement of each carriage relative to said frame from an upper retracted position to a lower position, each carriage including spaced front and rear ground engageable wheels rotatably mounted to the carriage for vertical movement with said carriages,
(d) counterbalance means operatively connected between the frame and each carriage to facilitate movement of said carriages between the upper and lower positions,
(e) means for selectively holding the carriages in the upper and lower positions,
(f) each carriage including front and rear ends interconnected by inner and outer longitudinal side members,
(g) said ground engageable wheels being rotatably mounted between said side members,
(h) the frame including front and rear relatively outstanding portions disposed adjacent said front and rear carriage ends and receiving said carriage therebetween,
(i) said outstanding portions providing housings,
(j) said counterbalance means including a spool mounted within each housing, each spool having at least one constant force spring having one end wound on said spool, and the other end being connected to adjacent ends of said carriage means,
(k) each end of each carriage including a depending portion having a longitudinally extending portion,
(l) each outstanding portion of said frame including a cut-out portion receiving said carriage extending portion, and
(m) said other end of said spring being connected to said extending portion.

16. A convertible vehicle with wheels comprising:
(a) a frame including a longitudinal axis and having guide means on each side thereof,
(b) spaced front and rear rail bearing wheels mounted to the frame in rotatable relation on each side of said axis,
(c) a pair of carriages each received in sliding relation by an associated guide means on one side of said frame for vertical movement of each carriage relative to said frame from an upper retracted position to a lower position, each carriage including spaced front and rear ground engageable wheels rotatably mounted to the carriage for vertical movement with said carriage,
(d) counterbalance means at each end of each carriage operatively connected between the frame and each carriage to facilitate movement of said carriages between the upper and lower positions, and
(e) means for selectively holding the carriages in the upper and lower positions.

17. A convertible vehicle as defined in claim 16, in which:
(f) each carriage extends longitudinally beyond the front and rear wheels, and
(g) the frame includes stop means to limit transverse movement of the ends of the carriages relative to the frame.

* * * * *